Dec. 8, 1970 P. E. FERGUSON 3,545,840

ENHANCED TRANSVERSE KERR MAGNETO-OPTICAL TRANSDUCER

Filed July 29, 1968 3 Sheets-Sheet 1

INVENTOR:
Patrick E. Ferguson

By Smyth, Roston & Pavitt
ATTORNEYS

Dec. 8, 1970 P. E. FERGUSON 3,545,840

ENHANCED TRANSVERSE KERR MAGNETO-OPTICAL TRANSDUCER

Filed July 29, 1968 3 Sheets-Sheet 2

INVENTOR:
Patrick E. Ferguson

By Smyth, Roston & Pavitt

ATTORNEYS

INVENTOR:
Patrick E. Ferguson

By Smyth, Roston & Pavitt
ATTORNEYS 3,545,840

ENHANCED TRANSVERSE KERR MAGNETO-OPTICAL TRANSDUCER

Patrick E. Ferguson, Torrance, Calif., assignor to The Magnavox Company, Torrance, Calif., a corporation of Delaware Filed July 29, 1968, Ser. No. 748,302
Int. Cl. G02f *1/34*
U.S. Cl. 350—151 12 Claims

ABSTRACT OF THE DISCLOSURE

The present invention relates to a magneto-optical transducer and more specifically relates to the enhancement of the transverse Kerr magneto-optical effect. Specifically, the invention is directed to a magneto-optical transducer using the transverse Kerr magneto-optic effect and wherein the transducer includes a layer of magnetic material of a critical thickness so as to provide a maximum change in the reflectivity of an optical wave directed to the thin magnetic film. Specifically, the thin magnetic film is deposited on one surface of an optical prism and the optical wave is directed toward the prism so as to produce a total internal reflection of the light energy. The thin magnetic film, however, frustrates the total internal reflection, but of the light that is reflected a change in the reflectivity is experienced in accordance with the direction of magnetization of the thin magnetic film. The invention also includes the use of a layer of dielectric material deposited over the thin magnetic film so as to increase the light which is reflected.

The invention relates to a magneto-optical transducer for reproducing information recorded on a magnetic medium such as a magnetic tape. The magneto-optical transducer of the present invention provides for a non-magnetic representation of the information recorded on the magnetic medium by producing a change in the amplitude of the light energy reflected from the magneto-optical transducer, which change in amplitude is in accordance with the magnetic information.

Specifically, the magneto-optical transducer of the present invention uses the transverse Kerr magneto-optical effect to produce an optical representation of the magnetic information recorded on the magnetic medium such as the magnetic tape. The transverse Kerr magneto-optical effect is detectable as a change in reflectivity when an optical wave, polarized in the plane of incidence, is reflected from the surface of a Kerr magnetic medium magnetized perpendicular to the plane of incidence. The change in reflectivity occurs for the two directions of magnetization of the magnetic medium, both of which directions are perpendicular to the plane of incidence. The change in reflectivity, therefore, appears as a change in the amplitude of the optical wave such as light energy in accordance with the direction of magnetization of the magnetic medium.

The use of a magneto-optical transducer for reading information recorded on a magnetic medium such as magnetic tape is desirable over the use of ordinary reproducing heads for many reasons. For example, a magneto-optical transducer produces less wear on the magnetic medium. Also, the use of a magneto-optical transducer provides for a higher density reproduction of information in comparison with conventional magnetic reproducing heads. Present magnetic recording-reproducing systems are limited in the reproducing of the information since conventional magnetic heads cannot reproduce with a resolution equal to that achieved with present recording heads.

An ideal magneto-optical reproducing system would direct light toward the magnetic medium, such as magnetic tape, with a corresponding reflection of the light from the surface of the magnetic medium. The use of a reproducing system which directs light toward the surface of the magnetic medium, such as magnetic tape, is impractical since the average magnetic medium does not include a specular surface so as to provide for an accurate reflection of the light energy. In order to overcome the above difficulty while still reproducing the information on the magnetic medium using the transverse Kerr magneto-optical effect, a magneto-optical transducer is used to provide for an indirect reading of the information on the magnetic medium.

The magneto-optical transducer of the present invention includes a substrate such as glass and specifically includes a substrate formed as an optical prism and wherein the optical prism has a thin film of magnetic material disposed on one surface of the substrate. The thin film of magnetic material is placed adjacent to the magnetic medium such as the magnetic tape. Light energy is directed through the substrate to the back face of the thin film and is reflected from the back face of the thin film. The magnetic information present in the magnetic medium, such as magnetic tape, induces corresponding magnetic states in the thin film. In order to have a proper induction of the magnetic information from the magnetic medium to the thin film, it is desirable to have the coercivity of the thin film lower than the coercivity of the magnetic medium.

The use of the magneto-optical transducer as described above provides for an excellent specular surface in the thin film so as to provide for the optical qualities required in a magneto-optical transducing system. Since the substrate and the thin film can both be accurately controlled, and since it is only necessary to provide one such magneto-optical transducer in each reproducing system, the cost of each magneto-optical transducer is small relative to the overall cost of the system.

One difficulty with the prior art magneto-optical transducers which used the transverse Kerr magneto-optical effect is the relatively small change of reflectivity and, therefore, the relatively small change in amplitude of the output signal. It is, therefore, desirable to increase the change in reflectivity of the optical wave, thereby providing for an increase in the magnitude of the output signal. Generally, the prior art magneto-optical transducers have not used the Kerr magneto-optical effect because the change in reflectivity has been so small. The present invention, however, provides for a magneto-optical transducer using the transverse Kerr magneto-optical effect which provides such a great change in reflectivity that a useful transverse Kerr magneto-optical transducer is produced. For example, the magneto-optical transducer of the present invention provides for a change in reflectivity which is at least three times as great, and may be nine times as great, as that produced in the prior art transverse magneto-optical transducers.

The present invention provides for this increase in the change in the reflectivity by the use of a magneto-optical transducer which includes a thin film of magnetic material having an optimum thickness in accordance with the specific magnetic material and with the thin film of magnetic material deposited on one surface of an optical prism, which prism is designed to provide for a total internal reflection. Actually, the thin film of magnetic material frustrates the total internal reflection to some degree so that the prism does not provide for a complete total internal reflection.

If the thin film has an increased thickness over that used in the present invention, which increased thickness would be generally the case for most magneto-optical transducers, the change in reflectivity would be due mainly to the transverse Kerr magneto-optical effect occurring upon the reflection of the optical energy from the interface between the optical prism and the thin film. If the thin film is too thin, the light energy would experience total internal reflection but there would not be sufficient magnetic material to interact with the light energy so as to produce any significant change in reflectivity. The optimum thickness for the magnetic thin film allows for a sufficient amount of magnetic material to interact with the light energy so as to produce a change of reflectivity while still allowing the optical prism to produce some total internal reflection so that a fair percentage of the optical energy is recovered.

The present invention, therefore, includes an optical prism which includes a thin film of magnetic material having an optimum thickness so as to maximize the change in reflectivity due to the transverse Kerr magneto-optical effect. The total amount of light which may be recovered may be increased by the use of a layer of dielectric material which is placed over the thin film of magnetic material so as to increase the total internal reflection effect of the optical prism and therefore redirect a portion of the light energy which would ordinarily be lost back through the thin film of magnetic material. A clearer understanding of the invention will be had with reference to the following description and drawings wherein:

Figure 1:
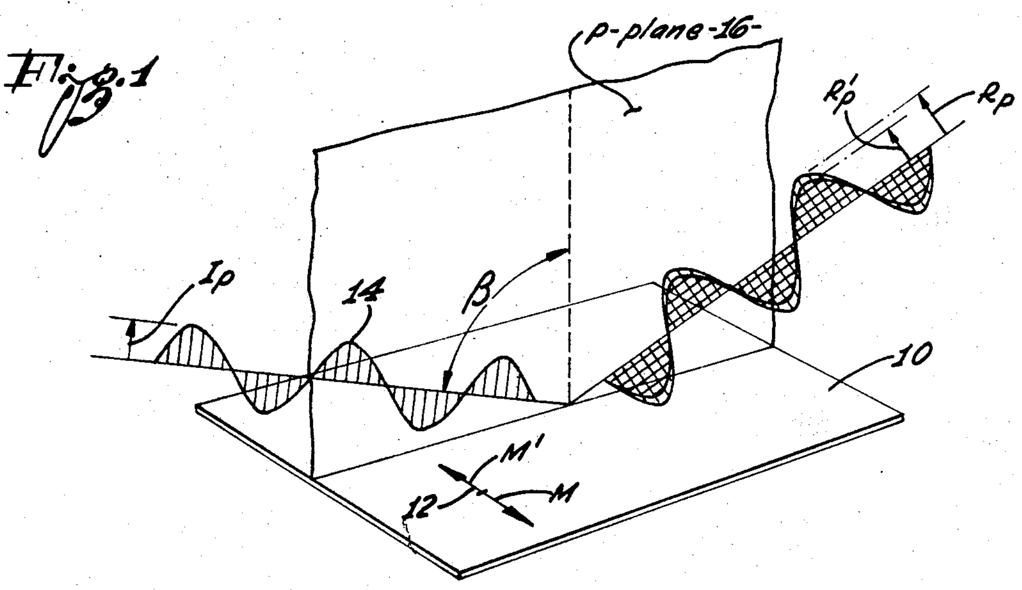
FIG. 1 is an illustration of a physical model showing the effect of the reflection of light energy from a magnetic surface and, in particular, showing the transverse Kerr magneto-optical effect.

FIG. 1 is an illustration of a model showing the reflection of light energy from a magnetic surface and particularly showing the change in reflection of the light energy due to the transverse Kerr magneto-optical effect. Since the transverse Kerr magneto-optical effect operates to change the reflection of light in its major plane of polarization, a maximum change of reflection and a measurement of that change of reflection occurs with the linearly polarized beam of light energy having its plane of polarization normal to the surface of the magnetic material. It is to be appreciated, however, that the transversely Kerr magneto-optical effect operates even if the light energy is not linearly polarized.

In FIG. 1, a magnetic material 10 is magnetized in the direction shown by the double arrow 12. One direction of magnetization is characterized as M, while the other direction of magnetization is characterized as M′. A beam of linearly polarized light energy 14 is shown directed toward the surface of the magnetic medium 10. For purposes of illustration, the magnetic vector of the light energy 14 is disregarded and only the electric vector is shown, which electric vector constitutes the beam of light 14. The electric vector in a plane of polarization is represented by the arrow $I_p$. The plane of polarization of the light energy 14 is normal to the surface of the magnetic medium 10 and the plane of polarization is represented by the p-plane 16. The angle of incidence between the beam of light energy 14 and a line normal to the surface of the magnetic material 10 is shown by the angle $\beta$.

As the light energy strikes the surface of the magnetic medium 10, a portion of the light energy is reflected in the plane of polarization 16. The reflected light energy may have one of two amplitudes in accordance with the direction of magnetization, specifically the amplitude of the reflected light energy may have a first value when the magnetization is characterized in the M direction and the reflected light energy may have a second amplitude when the magnetization of the light energy is in the M′ direction. The two amplitudes for the reflected light energy are represented by $R_p$ and $R_p'$. The absolute difference in amplitude of the two reflected waves is, therefore, equal to $R_p-R_p'$. Since the photodetectors which are used to detect light energy respond to intensity of light energy, which intensity is proportional to the square of the amplitude, the change in reflectivity as detected by a photodetector is given by the following formula, where R is equal to the reflectivity $$\Delta R^2=(R_p)^2-(R_p')^2$$

Since the change in intensity, $\Delta R^2$, is important when related to the average reflected light, a normalized reflectivity difference $\delta$ is used as the most pertinent measurement.

$$\delta=\frac{\Delta R^2}{\left[\frac{R_p+R_p'}{2}\right]^2}$$

In a system where the light energy passes through air before striking the magnetic material so that there is an air-to-metal interface, $\delta$ is approximately 0.5 to 1.0% for a material such as iron.

Figure 2:
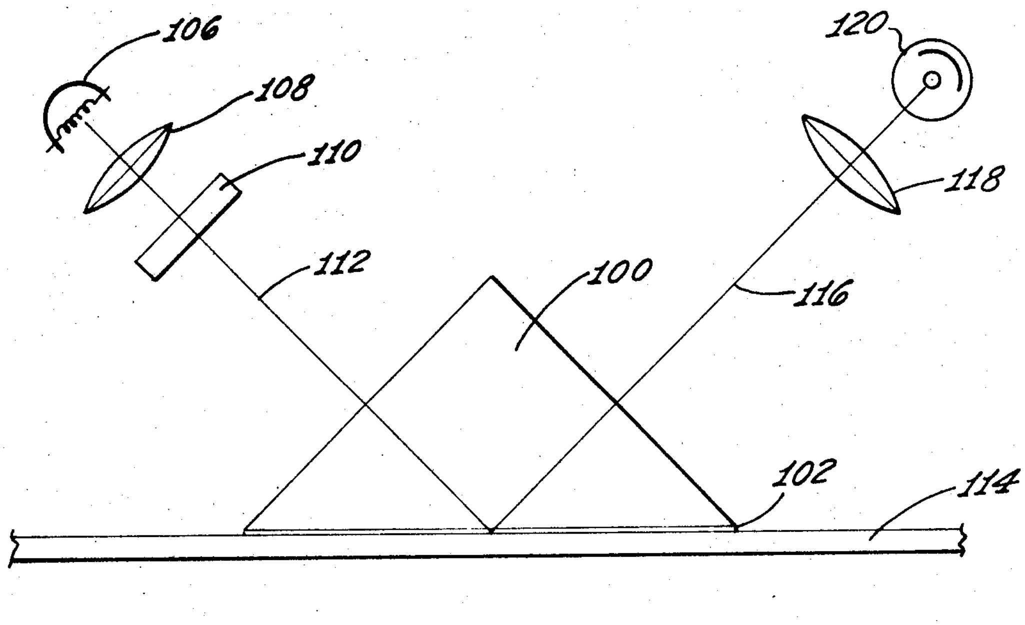
FIG. 2 illustrates a system including the magneto-optical transducer of the present invention.
Figure 3:
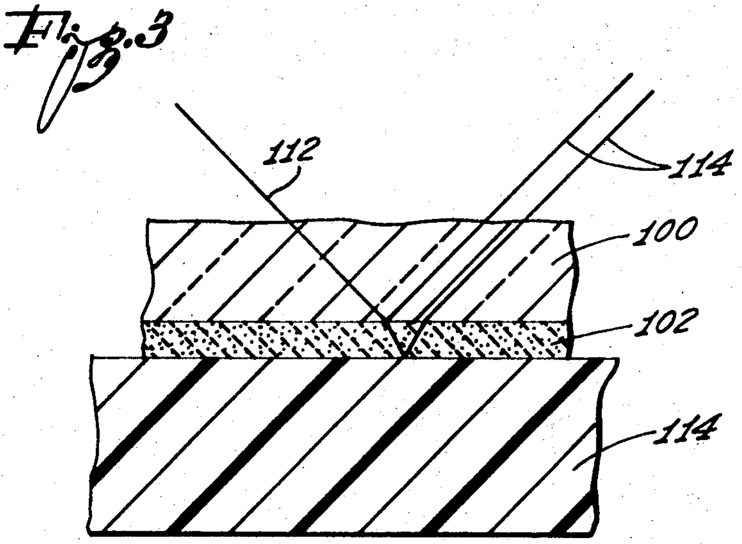
FIG. 3 illustrates a detailed view of one particular embodiment of the magneto-optical transducer of the present invention.
Figure 4:
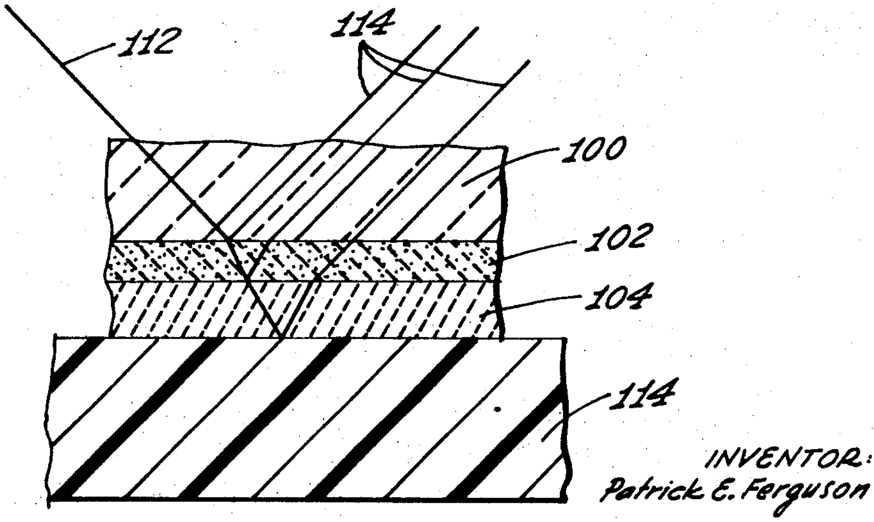
FIG. 4 illustrates a detailed view of a second particular embodiment of a magneto-optical transducer of the present invention.

In FIG. 2, a magneto-optical transducer constructed in accordance with the present invention is shown. The transducer of FIG. 2 produces reflected light energy having a maximum change in reflectivity for a particular magnetic material. The magneto-optical transducer of FIG. 2 includes a 45–45–90° optical prism 100, although prisms having other angular relationships may be used. The prism is generally designed to produce a total internal reflection. A thin film of magnetic material 102 having an optimum thickness is disposed on one surface of the optical prism 200. The thin film of magnetic material 100 may or may not have an additional coating of dielectric material in accordance with the particular embodiment of the invention to be used. For example, in FIG. 3 a first embodiment of the invention is shown in detail and includes only a thin layer of magnetic material 102. In FIG. 4, a second embodiment of the invention is shown and includes both a thin layer of magnetic material 102 and, in addition, a layer of dielectric material 104. The magnetic material 102 is adjusted to an optimum thickness so as to produce a maximum change of reflectivity. In addition, the dielectric material 104 may have an optimum thickness so as to produce a maximum in the reflected light in a manner to be explained later.

Returning to FIG. 2, a source of light energy 106, such as an incandescent light source, directs light to a lens system 108. The lens system 108 produces a collimated beam of light which passes through a polarizer 110. The polarizer 110 is adjusted to linearly polarize the light energy to produce a beam of light energy 112. It is to be appreciated that the light energy does not have to be linearly polarized.

The light energy 112 passes into the prism 100 and strikes the back surface of the thin film of magnetic material 102. A portion of the light energy is reflected and the magnitude of the reflection is in accordance with the transverse Kerr magneto-optical effect. Specifically, the thin film of magnetic material 102 is located adjacent to a magnetic medium 114. For example, the magnetic medium 114 may be a magnetic tape. The magnetic tape 114 has magnetic information recorded in the magnetic tape and specifically the magnetic information is recorded in a direction transverse to the plane of incidence of the light energy 112. Specifically, the direction of magnetization of the information in the magnetic tape 114 is as shown in FIG. 1.

The magnetic states of the information recorded on the magnetic tape 114 introduces corresponding magnetic states into the thin film of magnetic material 102. Therefore, the thin film of magnetic tape has magnetic information recorded transversely to the plane of incidence of light energy 112. The light energy 112, when reflected from the thin film 102, therefore, experiences a change in the reflectivity in accordance with the direction of magnetization in the thin film 102. The reflected light energy is designated as 116 and the reflected light energy passes through a lens system 118 and is focused by the lens system 118 on a photodetector 120. The photodetector measures the amplitude of the light energy. It is to be apprecited that the magnetic states may be produced in the thin film 102 using techniques other than placing the thin film adjacent to a magnetic medium. For example, copending application Ser. No. 675,266, filed Sept. 15, 1967 and assigned to the same assignee as the instant case discloses a thermomagnetic recording of information in a thin film.

As indicated above, the thin film of magnetic material has an optimum thickness so as to maximize the change in reflectivity. It is noted, however, that if the film of magnetic material 102 was relatively thick, the normalized reflectivity difference $\delta$ would be approximately 7% for a material such as iron. However, using an optimum thickness for the thin film of magnetic material 102, a particular example of a magneto-optical transducer produced a normalized reflectivity difference $\delta$ of 22%, which is a substantial increase over a transducer which did not have a thin film of optimum thickness.

In order to determine the proper thickness for the thin film of magnetic material 102, the magnetic thin film was evaporated onto the base of the optical prism 100 to get an approximate minimum in reflectivity. It is noted, however, that it is extremely difficult to accurately measure the exact minimum point in reflectivity and an analysis was undertaken as to the maximum enhancement of the reflectivity which could be accomplished with the same material which produced the normalized reflectivity of 22%. The analysis indicated that for that particular material, which was iron, the normalized reflectivity difference $\delta$ would have a maximum of 56%. The difference between the experimental and theoretical values is attributed to the lack of precision instrumentation for determining the exact minimum in the reflecivity during the deposition of the thin magnetic film and, of course, an increase in precision of the instrumentation could produce a higher normalized reflectivity difference which should approach the maximum of 56% for iron.

Figure 5:
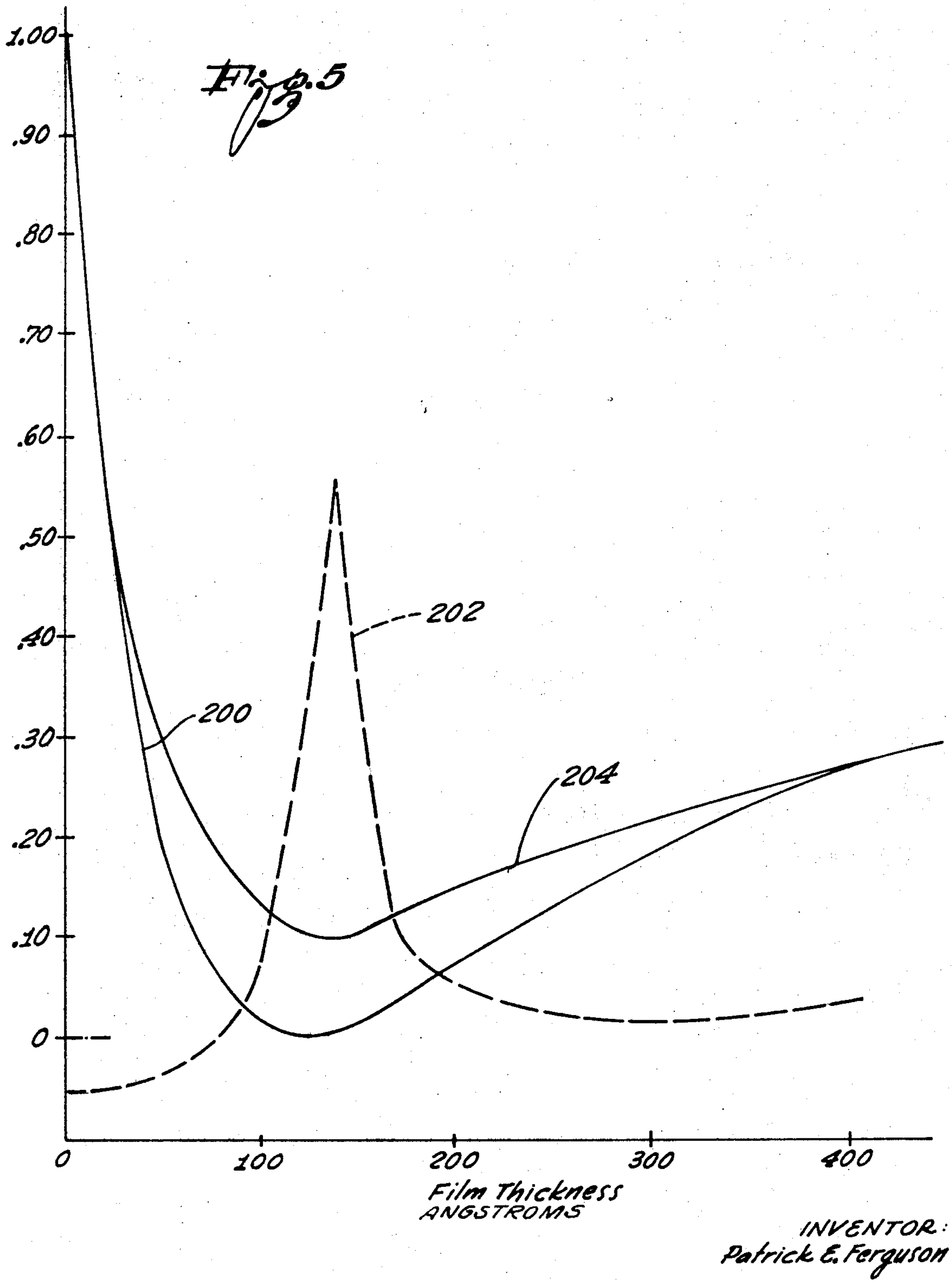
FIG. 5 illustrates a series of curves helpful in explaining the operation of the invention.

The minimum in reflectivity is measured during deposition since it appears that this point corresponds with the maximum in normalized reflectivity difference. This appears to result from the unique combination of the optical prism plus a thin film having an optimum thickness. For example, as shown in FIG. 5, a reflectivity curve 200 is illustrated, and the reflectivity is plotted versus film thickness. It can be seen that for zero film thickness the reflectivity is 100% since there is no film thickness to destroy the total internal reflection of the optical prism. As the film thickness increases, the reflectivity goes down to a minimum point and then rises back to a particular value. The particular value of the reflection for thick films actually depends upon the reflectivity of the material since the total internal reflection effect of the optical prism is almost completely destroyed.

In FIG. 5, the normalized reflectively difference is plotted as curve 202 and, as can be seen, the normalized reflectivity difference increases to a maximum of approximately 56% at the same time the reflectivity is at a minimum. Therefore, even though the actual amplitude of the output signal is at a minimum, the change in the amplitude is relatively high. In order to increase the amplitude of the signal while still maintaining a high change in the amplitude, an additional dielectric material may be used over the thin film of magnetic material 102. This is shown in FIG. 4 with the use of dielectric material 104.

The dielectric material 104 helps to restore some of the total internal reflection effect, thereby returning some of the light energy back through the thin film of magnetic material 102 to be detected by a photodetector so as to produce an increase in the reflected light energy, as can be seen by the curve 204 in FIG. 5. As can be seen in FIGS. 3 and 4, the light energy 112 enters the optical prism 100 and the light energy 114, which has experienced the transverse Kerr magneto-optical effect, appears to be made up of a plurality of rays of light energy. One possible explanation for the enhancement of the normalized reflectivity difference is that the total internal reflection is not completely destroyed using this very thin film of magnetic material, thereby allowing some of the light energy to be returned, which light energy passes through the thin film of magnetic material 102 and experiences the transverse Kerr magneto-optical effect at multiple points.

If the thin film is too thin, even though a great amount of the light energy is reflected since the total internal reflection effect of the prism is only very partially frustrated, there is not enough magnetic material to interact with the light energy to cause a significant transverse Kerr magneto effect. On the other hand, when the thin film is relatively thick and does not have the optimum thickness, the total internal reflection is substantially destroyed and the light energy only experiences one reflection at the interface. Although it is not clearly understood exactly why the use of the optimum thickness provides for the enhancement of the reflectivity difference, the enhancement does occur and it would not be normally expected. The use of the optimum thickness provides for a transverse Kerr magneto-optical transducer which is usable, whereas the prior art transverse Kerr magneto-optical transducers did not have a sufficient reflectively change to make them useful as transducers.

It is to be appreciated that although the invention has been described with regard to particular embodiments, and also where the invention has been described with regard to iron as magnetic material, it is apparent that the optimum thickness for the thin film of magnetic material is applicable to all magnetic materials and that other configurations for the optical prism may be used. Therefore, the foregoing description and drawings are illustrative of the invention but it is apparent that many adaptations and modifications may be made. The invention, therefore, is only to be limited by the appended claims.

What is claimed is:

1. A transverse magneto-optical transducer for use with a magnetic medium having magnetic information recorded on the medium transversely relative to light directed toward the magneto-optical transducer and with the magneto-optical transducer producing a change in the reflectivity of the light from the magneto-optical transducer in accordance with the magnetic information recorded on the magnetic medium, including

- a transparent substrate, and
- a thin magnetic film of a particular material disposed on one surface of the substrate and coupled to the magnetic medium and with the magnetic medium magnetically including the transverse magnetic information on the magnetic medium into the thin film to have the magnetic information in the thin film producing changes in the reflectivity of the light reflected from the thin film in accordance with the magnetic information in the thin film and with the thin film having an optimum thickness in accordance with the particular material to produce a maximum in the normalized reflectivity difference in the light from the thin film.

2. The magneto-optical transducer of claim 1 wherein the transparent substrate is an optical prism.

3. The magneto-optical transducer of claim 1 additionally including a layer of dielectric material disposed on the thin magnetic film and with the layer of dielectric material having a thickness to provide an optimum increase in the reflectivity of the transducer.

4. A transverse magneto-optical transducer for use with a magnetic medium having magnetic information recorded transversely on the medium relative to light directed to the magneto-optical transducer and with the magneto-optical transducer magnetically coupled to the magnetic medium to produce changes in the reflectivity of the light from the magneto-optical transducer with the changes in reflectivity in accordance with the magnetic information in the magneto-optical transducer, including:

an optical prism, and a thin magnetic film of a particular material disposed on one surface of the optical prism and with the thin magnetic film positioned adjacent to the magnetic medium to receive the transverse magnetic information on the magnetic medium and with the thin magnetic film receiving the light through the optical prism and for reflecting light having changes in reflectivity in accordance with the direction of the transverse magnetic information, and with the thin magnetic film of a particular thickness so as to optimize the normalized reflectivity difference of the light from the thin magnetic film.

5. The magneto-optical transducer of claim 4 additionally including a layer of dielectric material disposed on the thin magnetic film and with the layer of dielectric material having a particular thickness for increasing the light from the thin magnetic film.

6. A transverse magneto-optical transducer including a substrate for supporting a thin magnetic film for use with a magnetic medium having magnetic information recorded transversely on the medium relative to light energy directed toward the magneto-optical transducer and with the magneto-optical transducer producing output light energy having changes in amplitude in accordance with the magnetic information recorded on the magnetic medium, including:

a thin magnetic film of a particular material coupled to the magnetic medium and with the thin magnetic film supported by the substrate and with the magnetic medium magnetically inducing the magnetic information on the magnetic medium into the thin film to have magnetic information in the thin film corresponding to the magnetic information on the magnetic medium and with the light energy directed toward the thin film producing light reflected from the thin film having variations in amplitude in accordance with the magnetic information in the thin film and with the thin film having a particular thickness in accordance with the particular material to produce a maximum in the normalized reflectivity difference in the light from the thin film.

7. The magneto-optical transducer of claim 6 additionally including a layer of dielectric material disposed on the thin magnetic film to increase the amplitude of the light from the thin film.

8. A transverse magneto-optical transducer for use in reproducing magnetic information recorded transversely relative to light directed to the magneto-optical transducer and with the magneto-optical transducer producing changes in the reflectivity of the light from the magneto-optical transducer and with the changes in reflectivity in accordance with the magnetic information recorded in the magneto-optical transducer, including:

an optical prism, and a thin magnetic film of a particular material disposed on one surface of the optical prism and with the thin magnetic film having transverse magnetic information relative to light directed through the optical prism and to the thin magnetic film and with the thin magnetic film reflecting light having changes in reflectivity in accordance with the direction of the transverse magnetic information, and with the thin magnetic film of a particular thickness so as to optimize the normalized reflectivity difference of the light from the thin magnetic film.

9. The magneto-optical transducer of claim 8 additionally including a layer of dielectric material disposed on the thin magnetic film and with the layer of dielectric material having a particular thickness for increasing the light from the thin magnetic film.

10. A transducer system for use with a magnetic medium having magnetic information recorded on the medium, including a magneto-optical transducer, first means operatively coupled to the magneto-optical transducer for directing light energy toward the magneto-optical transducer for producing light from the magneto-optical transducer having variations in amplitude in accordance with the magnetic information recorded on the magnetic medium, second means operatively coupled to the magneto-optical transducer for receiving the light from the magneto-optical transducer and for producing an output signal having characteristics in accordance with the variations in amplitude of the light, and the magneto-optical transducer including a substrate, and a thin magnetic film of a particular material disposed on one surface of the substrate and coupled to the magnetic medium to have magnetic states in the thin film corresponding to the magnetic information on the magnetic medium and with the thin film receiving the light from the first means and reflecting it to the second means and with the magnetic states in the thin film located transversely relative to the light received from the first means and with the thin film having a particular thickness in accordance with the particular material to produce a maximum in the normalized reflectivity difference in the light reflected toward the second means.

11. The transducer system of claim 10 wherein the substrate is an optical prism.

12. The transducer system of claim 10 wherein the magneto-optical transducer additionally includes a layer of dielectric material disposed on the thin film and with the layer of dielectric material having a particular thickness for increasing the amplitude of the light directed to the second means.

References Cited

UNITED STATES PATENTS

| | | | |
|---|---|---|---|
| 3,307,897 | 3/1967 | Lohmann. | |
| 3,417,398 | 12/1968 | Lewis et al. | |
| 3,443,098 | 5/1968 | Lewis. | |
| 3,474,428 | 10/1969 | Nelson et al. | |
| 3,476,460 | 11/1969 | Hansen et al. | |
| 3,196,206 | 7/1965 | Griffiths | 350—174.1X |
| 3,224,333 | 12/1965 | Kolk et al. | 350—151 |
| 3,229,273 | 1/1966 | Baaba et al. | 350—151X |
| 3,451,740 | 6/1969 | Smith | 350—151 |

OTHER REFERENCES

Alstad et al.: "Magneto-Optical Readout Device" IBM Technical Disclosure Bulletin vol. 9, No. 12 (May 1967) pp. 1763–1764.

DAVID SCHONBERG, Primary Examiner

P. R. MILLER, Assistant Examiner

U.S. Cl. X.R.

340—174.1; 350—160; 356—118